3,497,801
SYSTEM FOR DETERMINING THE DIFFERENCE IN CAPACITANCE OF TWO CAPACITORS
John C. Clower, Cypress, and William A. Music, Pomona, Calif., assignors to Schwien Engineering, Inc., Pomona, Calif., a corporation of California
Filed Feb. 23, 1967, Ser. No. 618,165
Int. Cl. G01r *11/52, 27/26*
U.S. Cl. 324—60
6 Claims

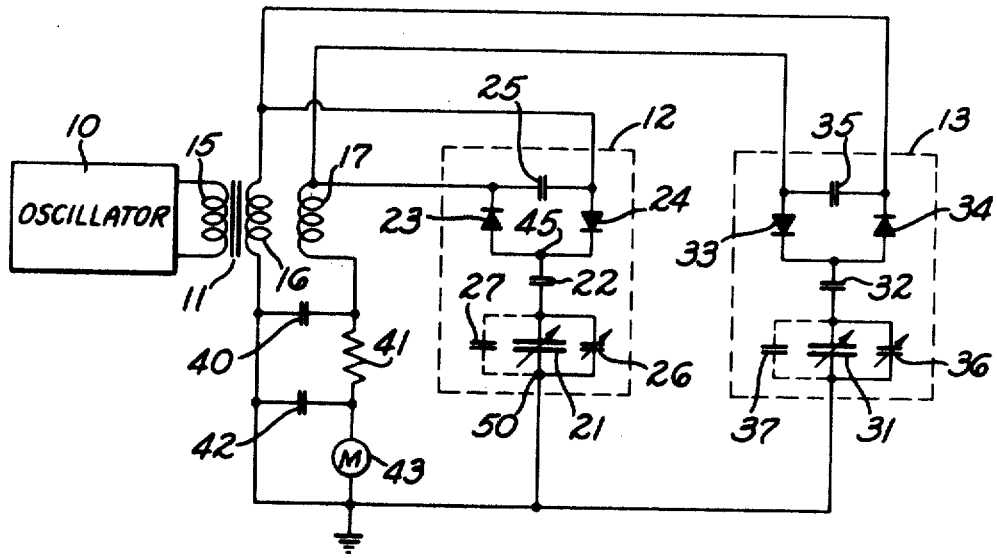
INVENTORS.
JOHN C. CLOWER
WILLIAM A. MUSIC
BY THEIR ATTORNEYS.
HARRIS, KIECH, RUSSELL & KERN ial unit and
United States Patent Office 3,497,801
Patented Feb. 24, 1970

ABSTRACT OF THE DISCLOSURE

A capacitance gauging system including an oscillator and a transformer with bifilar secondary windings for each of two capacitance units, such as the capacitors of a mercury manometer. Each capacitance unit includes a pair of oppositely poled diodes in series with the capacitor being measured, and another capacitor across the diodes. The windings are connected to the capacitance units so as to provide common A.C. paths and separate D.C. paths, with unbalanced D.C. currents indicating capacitance difference, and with the system operation independent of lead lengths, orientation and movement.

---

This invention relates to capacitance gauging systems and, in particular, to a new and improved system for determining the difference in capacitance of two capacitors, as when comparing an unknown capacitor with a known capacitor and when two capacitors are being balanced or made equal.

Capacitance measurements ordinarily utilize an A.C. signal source and problems are encountered in connection with lead lengths, balancing of lead construction and balancing of other circuit elements, variations introduced by movement of one or more components, adjustments required for circuit balance and the like. It is an object of the present invention to provide a new and improved capacitance gauging system wherein such problems are substantially eliminated. It is a particular object to provide such as system which places no requirements on the size, orientation, movement or balancing of the leads which connect each of the capacitors with the A.C. source. A further object is to provide such a system which has a high sensitivity and which provides for very accurate capacitance measurement.

It is an object of the invention to provide a new and improved capacitance gauging system which can be used for measuring the capacitance of an unknown capacitor by comparison with a known capacitor, and which can be used for indicating exact balance of two capacitors. A further object is to provide such a capacitance gauging system which is suitable for use with mercury pool capacitors such as are used in manometers of the type described in U.S. Patents Nos. 3,225,599 and 3,296,867.

Another object of the invention is to provide such a system which is highly sensitive, accurate and stable and one which provides a high output permitting operation with conventional moving coil indicating instruments.

It is an object of the invention to provide a system for comparing the capacitances of first and second capacitors and including first and second sources of substantially identical A.C. electric power, each having a pair of terminals, means providing a D.C. path between one terminal of each of the sources and one side of both of the first and second capacitors, and including means providing an A.C. path between the one terminals and a D.C. current indicating means in the D.C. path from one terminal, a first demodulator connected between the other terminal of each of the sources and the other side of the first capacitor, a second demodulator connected between the other terminal of each of the sources and the other side of the second capacitor, means at the first demodulator providing an A.C. path between the other terminals, and means at the second demodulator providing an A.C. path between the other terminals of the sources. A further object is to provide such a system in which each of the demodulators comprises a pair of unidirectional conducting devices, typically diodes, connected in opposing polarities.

The invention also comprises novel combinations and arrangements of elements, which will more fully appear in the course of the following description. The drawing is an electrical schematic showing a preferred embodiment of the present invention which is given by way of illustration or example.

The circuit of the drawing includes an oscillator 10, a transformer 11, and capacitor units 12 and 13.

The oscillator 10 may be a conventional unit and typically may provide an output at 200 kilocycles per second. The transformer 11 has a primary winding 15 driven by the oscillator 10 and secondary windings 16, 17 which function as A.C. sources for the system. It is desirable to have the outputs of the two windings 16, 17 as equal as possible. In the preferred form described herein, the windings 16, 17 are made in the form of a bifilar winding which may comprise two conductors twisted to form a twisted pair conductor, with the twisted pair conductor wound to form the transformer secondary coil. With this construction, the outputs at the terminals of the windings 16, 17 will be identical.

The capacitor unit 12 includes a capacitor 21 which is one of the capacitors being measured. Another capacitor 22 may be connected in series with the capacitor 21. A unidirectional conducting device, typically a semiconductor diode 23 is connected between the capacitor 22 and one terminal of the winding 17. Another diode 24 is connected between the capacitor 22 and the corresponding terminal of the winding 16. The diodes 23, 24 are connected with opposing polarity. A capacitor 25 is connected between the anode of the diode 23 and the cathode of the diode 24. A small trimming capacitor 26 may be connected in parallel with the capacitor 21 to provide for matching stray capacitance when desired, the stray capacitance being indicated at 27.

The capacitor unit 13 is constructed similar to the capacitor unit 12, with the diode 33 connected to the winding 17 with opposite polarity to the diode 23 and with the diode 34 connected to the winding 16 in opposite polarity to the diode 24.

A capacitor 40 is connected across the terminals of the windings 16, 17. A resistor 41 and a capacitor 42 are connected as a low pass filter to a meter 43. The meter 43 is a D.C. current indicating device and may be a conventional instrument. A vacuum tube voltmeter can be used if desired but the output of the system is such that conventional moving coil instruments may be used for most applications.

The capacitors 21, 31 represent the capacitors being measured and may take any form. The specific circuitry illustrated is particularly suitable for use with mercury manometers such as are described in the aforementioned United States patents. The lower plate of the capacitor 21 may be the upper surface of the mercury pool in one of the cisterns or containers and the upper plate of the capacitor 21 may be the metal plate which is fixed in position above the mercury pool. The capacitor 31 may have similar construction. In the manometer, the mercury pools are interconnected by a length of tubing and one of the mercury containers is movable vertically with respect to the other. It is desirable to have the spacing between the mercury surface and the metal plate the same in both cisterns which is achieved by moving one cistern relative to the other until the capacitance of the two cisterns is balanced. The system of the present invention provides a new and improved circuit for determining the capacitance balance.

The capacitors 22, 32 are inserted in series with the capacitors 21, 31, respectively, for blocking direct currents which might occur when mercury sloshes and contacts the metal plate. The capacitors 22, 32 are not essential to the operation of the gauging system. The trimming capacitors 26, 36 are utilized for balancing out the stray capacitances of the units prior to introduction of the mercury and are not essential to the operation of the gauging system.

The gauging system actually measures the capacitance between the point 45 and the point 50 (capacitor unit 12). However, when the blocking capacitors 22, 32 are selected to be equal in value and the trimming capacitors 26, 36 are adjusted to make the overall capacitances equal, the variation in capacitances as measured by the system will be variations resulting from changes in capacitance of the capacitors 21 and 31.

In a typical installation, the capacitors 21 and 31 will have a value of about 50 picofarads while the trimming capacitors will have a value of about one picofarad and the blocking capacitors will have a value of about 1,000 picofarads. The capacitors 25 and 35 can be about 0.5 microfarad, the capacitors 40 and 42 about 5 microfarads, and the resistor 41 about 1,000 ohms. In this particular system, the output at the windings 16, 17 is about 400 volts A.C. and in the range of 50 to 500 kc./s.

In discussing the operation of the circuit, first consider a positive half cycle with the upper terminals of the windings 16, 17 positive and the lower terminals negative. There will be a current from the upper terminal of the winding 17 through the diode 23, the capacitor 21 and the meter 43 back to the lower terminal of the winding 17. There will also be a current from the upper terminal of the winding 16 through the diode 34 and the capacitor 31 back to the lower terminal of the winding 16. There will be a voltage drop through each of the diodes in the order of about 0.7 volt. The diodes preferably are selected to have substantially identical characteristics so that variations in voltage drops across the two diodes will be insignificant in relation to the 400 volts applied across the unit. The capacitors 25 and 35 function as A.C. clamps, tying the two windings together at the diodes of the respective units. Similarly, the capacitor 40 serves as an A.C. clamp tying the two windings together at their lower terminals. Under these conditions, variations in D.C. current through the two windings will result only from variations in impedance of the capacitors 21, 31 and the current difference will be indicated on the meter 43.

The operation is similar during a negative half cycle when the lower terminals of the windings are positive with respect to the upper terminals. There will be a current from the winding 16 through the capacitor 21 and the diode 24 back to the winding 16. There will be a current from the winding 17 through the meter 43, the capacitor 31 and the diode 33 back to the winding 17. The diodes 24 and 33 will also be matched so that the current difference in these two paths will again be due only to capacitance difference of the two capacitors. With the system of the invention, the length of the leads connecting the transformer windings to the capacitor units has no effect on the actual measurements. The leads do not have to be the same length to both units, the leads may be placed in various configurations, the leads may be moved, all without affecting the system operation. It is desirable, of course, to physically locate the diodes and associated clamping capacitors as close as possible to the capacitors being measured. This is the only physical restraint upon the construction of the system.

The system may be utilized to indicate when two capacitors are equal in capacitance. The meter 43 indicates an unbalance in the D.C. currents through the windings 16, 17. When an unbalance is indicated, the capacitance of one or both of the capacitors 21, 31 can be varied to bring the meter to a null indication. At this time the two capacitors will have equal capacitance. This is the type of operation utilized with the aforementioned mercury manometers. In another application, one of the capacitors 21, 31 may have an unknown value and the other may be a calibrated unit. The calibrated unit is varied until a null is indicated, at which time the value of the unknown capacitor is the same as that indicated on the calibrated unit.

A particular advantage of the gauging system of the present invention is the fact that no adjustments are required during the operation. The secondary windings of the transformer are initially constructed to provide equal outputs and the diodes are selected for matched characteristics. The trimming capacitors may be utilized in some applications for balancing out the stray capacitances of the capacitor structures. However, once these aspects of the system have been taken care of, no adjustments are called for during the operation.

We claim as our invention:

1. In a capacitance gauging system, the combination of:
   first and second capacitors;
   first and second sources of substantially identical A.C. electric power, each having a pair of terminals;
   a third capacitor connected across one terminal of each of said sources;
   D.C. current indicating means connected in parallel with said third capacitor;
   first and second diodes, with the first diode cathode and second diode anode connected together and to one side of the first capacitor, and with the first diode anode connected to the other terminal of one of said sources and the second diode cathode connected to the other terminal of the other of said sources;
   third and fourth diodes, with the third diode anode and fourth diode cathode connected together and to one side of said second capacitor, and with the third diode cathode connected to the other terminal of said one source and the fourth diode anode connected to the other terminal of said other source;
   a fourth capacitor connected across the first diode anode and second diode cathode;
   a fifth capacitor connected across the third diode cathode and fourth diode anode; and
   means for connecting the other side of each of said first and second capacitors to the one terminal of one of said sources.

2. A system as defined in claim 1 including a variable capacitor connected in parallel with said first capacitor and another variable capacitor connected in parallel with said second capacitor, with the capacitance of each of said variable capacitors being relatively small with respect to that of said first and second capacitors.

3. A system as defined in claim 1 including a low pass filter connected between said third capacitor and said current indicating means.

4. A system as defined in claim 1 in which said first and second diodes and fourth capacitor are located at said first capacitor remote from said sources, and said third and fourth diodes and fifth capacitor are located at said second capacitor remote from said sources.

5. In a system for comparing the capacitances of first and second capacitors, the combination of:
   first and second sources of substantially identical A.C. electric power, each having a pair of terminals;
   conductor means providing a D.C. path between one terminal of each of said sources and one side of both of the first and second capacitors, and including capacitor means providing an A.C. path between said one terminals, and a D.C. current indicating means connected in the D.C. path from one of said one terminals;

a first full wave demodulator connected between the other terminal of each of said sources and the other side of the first capacitor;

a second full wave demodulator connected between the other terminal of each of said sources and the other side of the second capacitor;

a third capacitor at said first demodulator providing an A.C. path between said other terminals; and a fourth capacitor at said second demodulator providing an A.C. path between said other terminals.

6. A system as defined in claim 5 in which each of said demodulators comprises a pair of unidirectional conducting devices connected in opposing polarity.

References Cited

UNITED STATES PATENTS

| | | | |
|---|---|---|---|
| 2,746,295 | 5/1966 | Lubkin | 324—61 X |
| 2,881,392 | 4/1959 | Heinz | 324—98 |
| 3,119,267 | 1/1964 | Bartky | 324—61 X |
| 3,159,786 | 12/1964 | Bayne | 324—60 |
| 3,271,669 | 9/1966 | Lode | 324—60 |
| 3,299,384 | 1/1967 | Lee | 336—171 |
| 3,302,459 | 2/1967 | Isoda et al. | 324—61 X |

EDWARD E. KUBASIEWCZ, Primary Examiner

U.S. Cl. X.R.

73—401